(12) United States Patent
Ijzerman et al.

(10) Patent No.: US 7,375,885 B2
(45) Date of Patent: May 20, 2008

(54) AUTOSTEREOSCOPIC DISPLAY

(75) Inventors: Willem Lubertus Ijzerman, Eindhoven (NL); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 256 days.

(21) Appl. No.: 10/550,880

(22) PCT Filed: Mar. 26, 2004

(86) PCT No.: PCT/IB2004/050335

§ 371 (c)(1),
(2), (4) Date: Sep. 27, 2005

(87) PCT Pub. No.: WO2004/088995

PCT Pub. Date: Oct. 14, 2004

(65) Prior Publication Data

US 2006/0262395 A1    Nov. 23, 2006

(30) Foreign Application Priority Data

Mar. 31, 2003   (EP)   ................... 03100838

(51) Int. Cl.
*G02B 27/22* (2006.01)
(52) U.S. Cl. .......................... 359/462; 353/7
(58) Field of Classification Search ............ None
See application file for complete search history.

(56) References Cited

U.S. PATENT DOCUMENTS

| 5,663,831 | A | | 9/1997 | Mashitani et al. |
| 5,694,235 | A | * | 12/1997 | Kajiki .................. 359/202 |
| 5,850,580 | A | * | 12/1998 | Taguchi et al. .......... 396/330 |
| 5,903,304 | A | | 5/1999 | Deter |
| 5,969,850 | A | | 10/1999 | Harrold et al. |
| 6,137,456 | A | * | 10/2000 | Bhagavatula et al. ......... 345/7 |
| 6,433,930 | B1 | | 8/2002 | Son |
| 6,533,420 | B1 | | 3/2003 | Eichenlaub |
| 2002/0071178 | A1 | * | 6/2002 | Suganama ............... 359/462 |
| 2002/0135673 | A1 | * | 9/2002 | Favalora et al. .......... 348/42 |
| 2005/0213182 | A1 | * | 9/2005 | Cossairt et al. .......... 359/244 |

FOREIGN PATENT DOCUMENTS

| JP | 08256359 | 10/1996 |
| JP | 11103474 | 4/1999 |
| WO | 9735426 A1 | 9/1997 |
| WO | 0072605 A1 | 11/2000 |

OTHER PUBLICATIONS

Wolfgang Hascher, et al: Dreidimensional in GroBformat, Jul. 1992, No. 15, pp. 22-24-26, XP000307793.

\* cited by examiner

*Primary Examiner*—Stephone B. Allen
*Assistant Examiner*—Lee Fineman
(74) *Attorney, Agent, or Firm*—Larry Liberchuk

(57) ABSTRACT

In an autostereoscopic display, a cylindrical lens focuses collimated light emitted from pixels of a display array, and a scanning device sequentially provides the light to openings in a display screen. The image information is provided in the display area at a rate corresponding to the frequency of the scanning of the openings in the display screen to provide the autostereoscopic image.

17 Claims, 10 Drawing Sheets

AUTOSTEREOSCOPIC DISPLAY

The invention relates to an autostereoscopic display device comprising a display array comprising a number of addressable pixels, and a means for addressing the pixels in the display array.

BACKGROUND OF THE INVENTION

An autostereoscopic display device of the type described in the opening paragraph is known from U.S. Pat. No. 5,969,850.

Basically, a three dimensional impression can be created by using stereo pairs (two different images directed at the two eyes of the viewer), holographic techniques, or multiple planes in the displays. With the multiplanar techniques, a volumetric image is constructed, in which the 2D pixels are replaced by so-called voxels in a 3d volume. A disadvantage of most multiplanar displays is that the voxels produce light, but do not block it. This leads to transparent objects, giving quite literally a ghostly and unpleasant appearance to the displayed images.

Stereoscopic displays do not suffer from this problem. There are several ways to produce stereo images. The images may be time multiplexed on a 2D display, but this requires that the viewers wear glasses with e.g. LCD shutters. When the stereo images are displayed at the same time, the images can be directed to the appropriate eye by using a head mounted display, or by using polarized glasses (the images are then produced with orthogonally polarized light). The glasses worn by the observer effectively route the views to each eye. Shutters or polarizer's in the glasses are synchronized to the frame rate to control the routing. To prevent flicker, the frame rate must be doubled or the resolution halved with respect to the two dimensional equivalent image. A disadvantage with such as system is that the two images produce only a limited "look around" capability. Furthermore, glasses have to be worn to produce any effect. This is unpleasant for those observers who are not familiar with wearing glasses and a potential problem for those already wearing glasses, since the extra pair of glasses do not always fit.

Instead of near the viewers eyes, the two stereo images can also be split at the display screen by means of splitting screen such as a parallax barrier, as e.g. shown in U.S. Pat. No. 5,969,850.

Although these displays are autostereoscopic in the sense that no special glasses are required to view the 3D image, they often work only for one viewer at a fixed position in space. The viewing zone is very narrow. Outside the viewing zone, the observer sees multiple images or a stereo inversion, leading to a very unpleasant view. In practice this means that for many application, for instance in living rooms, the viewing zone is so small that the viewer has to be seated at one particular spot to be able to see a 3D image. Solution which offer multi-view images do so at the cost of resolution.

The device known from United States Patent U.S. Pat. No. 5,969,850 offers a solution to the narrow viewing zone problem by using a dynamic parallax barrier, i.e. a parallax barrier wherein the barrier slits move across the screen.

Although it is possible to obtain a multiview autostereoscopic display in the manner described in U.S. Pat. No. 5,969,850, a drawback of the above described principle is a lack of efficiency. Only a small amount of the light emitted passes the dynamic parallax barrier. For instance, if we use a parallax barrier display with 1000 slots (so, 1000 sub-frames), we have a horizontal resolution of 1000 pixels. However, the light shines on the whole backside of the parallax barrier and the latter blocks 99:9% of the light. So, for a television application we need at least a very high light intensity to get a sufficiently bright picture. Although the efficiency can be improved by making several slots of the dynamic barrier transparent at the same time, the principle problem of a very poor efficiency remains and in order to be able to use several slots the amount of different viewing directions has to be compromised

SUMMARY OF THE INVENTION

It is therefore an object of the invention to provide an alternative to the known device enabling autostereoscopic views and an improved efficiency.

To this end the device in accordance with the invention is characterized in that the display device comprises a means for providing collimated light emitted by the pixels of the display array, a cylindrical lens for focusing the image displayed on the display array in a direction perpendicular to the longitudinal axis of the cylindrical lens, the device further comprising a display screen comprising a number of openings upon which the image displayed on the display array is in operation focused, and a scanning means to sequentially scan over said openings on the display screen, and means for changing the image information on the display array in a rate corresponding to the frequency of scanning of the openings in the display screen.

Collimated light means, within the concept of the invention, light which is confined to within a relatively narrow angle, typically less than 10 degrees, preferably less than 5 degrees and most preferably within approximately 2 degrees. Within the framework of the invention "collimation" means collimation in at least one direction, the direction of scanning, not necessarily in two direction, i.e. not necessarily also in a direction perpendicular to the scanning direction. In practice this will often mean collimation in the horizontal direction (left-right), whereas collimation in a vertical direction (up-down) will or can be much less or not apparent.

The viewing directions of every vertical line on the display screen are constructed by projecting a two dimensional display array on one vertical line formed by a cylindrical lens by means of a positive cylindrical lens in between the display array and the display screen. During a frame time, the openings on the display screen are scanned from left to right (or the opposite) by means of scanning means, such as e.g. and preferably a rotating mirror or polygon. For every vertical line a new picture is displayed on the two-dimensional display screen. So, the display array has to be sufficiently fast like, i.e. when e.g. a frame rate of 50 Hz is used and 1000 cylindrical lenses are used on the display screen the rate of change of the display array has to be 50*1000=50 kHz. Such devices exits e.g. LCD's based on ferro-electric liquid crystals and micro-mirror arrays.

The device in accordance with the invention has the advantage that a high efficiency is obtained since all the light emitted by the display array is used, furthermore the device can be used in 3D mode, as well as in a 2D mode, by simply changing the information sent to the display array, thus it is 2D-3D compatible. The device allows a large number of viewing zones, without having to use goggles, or having a very poor efficiency.

To increase the total viewing angle, the use of cylindrical lenses on or near the display screen is preferred. Without these elements the viewing angle would be too small for a domestic television application.

In addition, the use of a lens in between the display array and the display screen to reduce the optical path length is preferred to reduce the depth of the display device.

To get a good display screen performance, a good synchronization of the (sub)frame rate of the two-dimensional display and the scanning by the scanning means e.g. the speed of rotation of a rotating mirror or polygon is preferred. In the preferred class of embodiments this is achieved by means of a feed-back mechanism that uses an index signal of index light sensors (e.g. photo-diode(s)) to detect the position of the light beam on the back side of the display screen.

In a preferred class of embodiments the device is provided with a slit shadow mask in between the scanning means and the display screen. To get a good performance its must be ensured that the image intended to fall on a cylindrical lens, indeed falls on the cylindrical lens. By using a slit shadow mask in between the scanning means and the display screen slight misalignments of the light path are counteracted, be it at a cost of reducing the brightness of the display.

In another preferred class of embodiments the display screen is provided with index light sensors and the side facing the scanning means, and the signal from the index light sensors is fed back to the scanning means.

These and other aspects of the invention are apparent from and will be elucidated with reference to the embodiments described hereinafter.

DETAILED DESCRIPTION OF PREFERRED EMBODIMENTS

Figure 1:
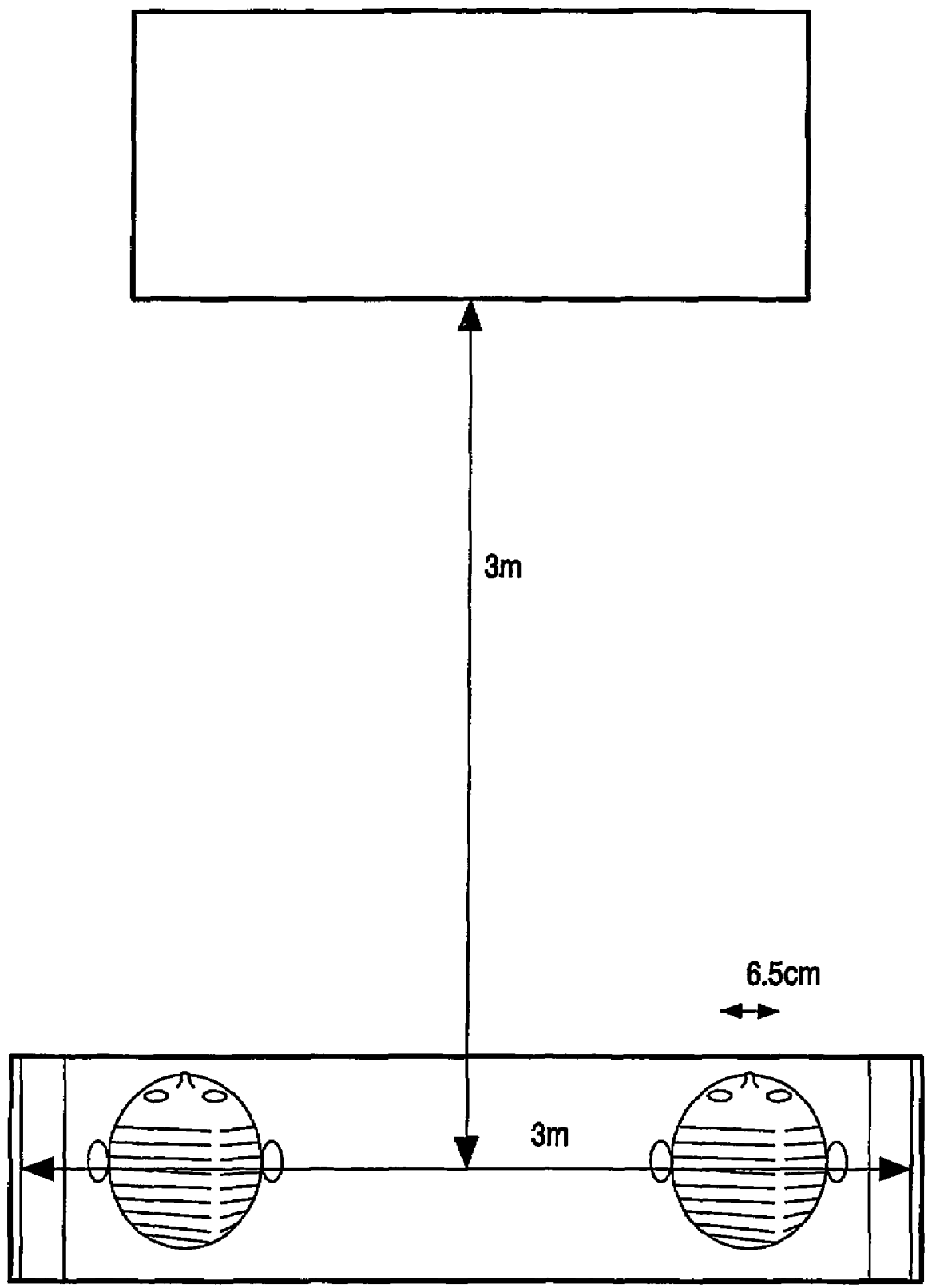
FIG. 1 illustrates the basic principle of a display device.

FIG. 1 illustrates a display device. For a three-dimensional television one needs a large number of viewing directions in which light is emitted independently. In a domestic application, the viewing distance is approximately 3 m and people sits on a couch that is approximately 3 m wide, see illustration 1. So, a viewing angle of at least 60-degrees is needed. Our eyes are positioned at 6:5 cm from each other. To arrive at different pictures for each eye, the display needs to emit light in at least 3 m/6:5 cm=300/6:5=50 directions. To arrive at a three-dimensional picture without discontinuous transitions if one moves one's head, a three-dimensional television should emit light in much more than 50, say at least 100, directions.

Figure 2:
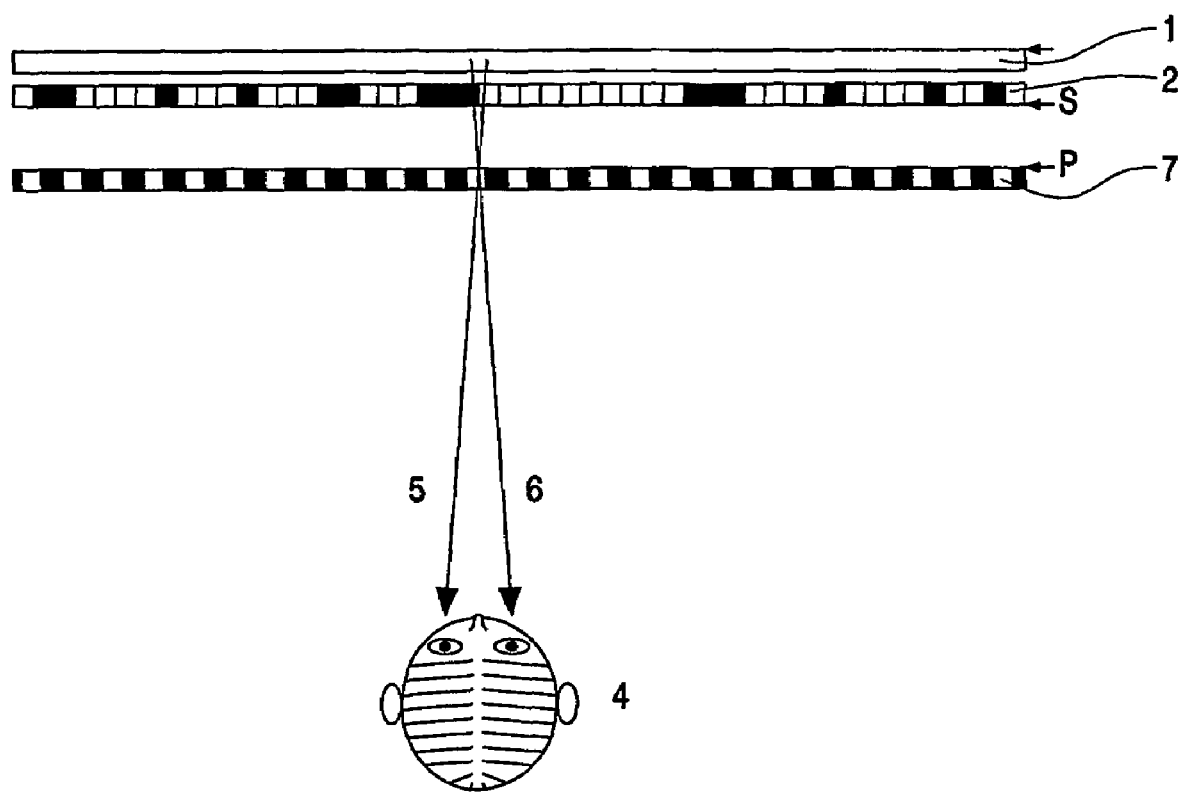
FIG. 2 illustrates the basic principle of a parallax barrier splitting two stereo images.

FIG. 2 illustrates the basic principle of a parallax barrier splitting two stereo images. The vertical lines of two stereo images are alternatingly displayed on, e.g., a spatial light modulator 2 (e.g. a LCD) with a back light 1. The grating structure of the parallax barrier 7 ensures that each eye of the viewer 4 sees the appropriate stereo image (5, 6).

Figure 3A:
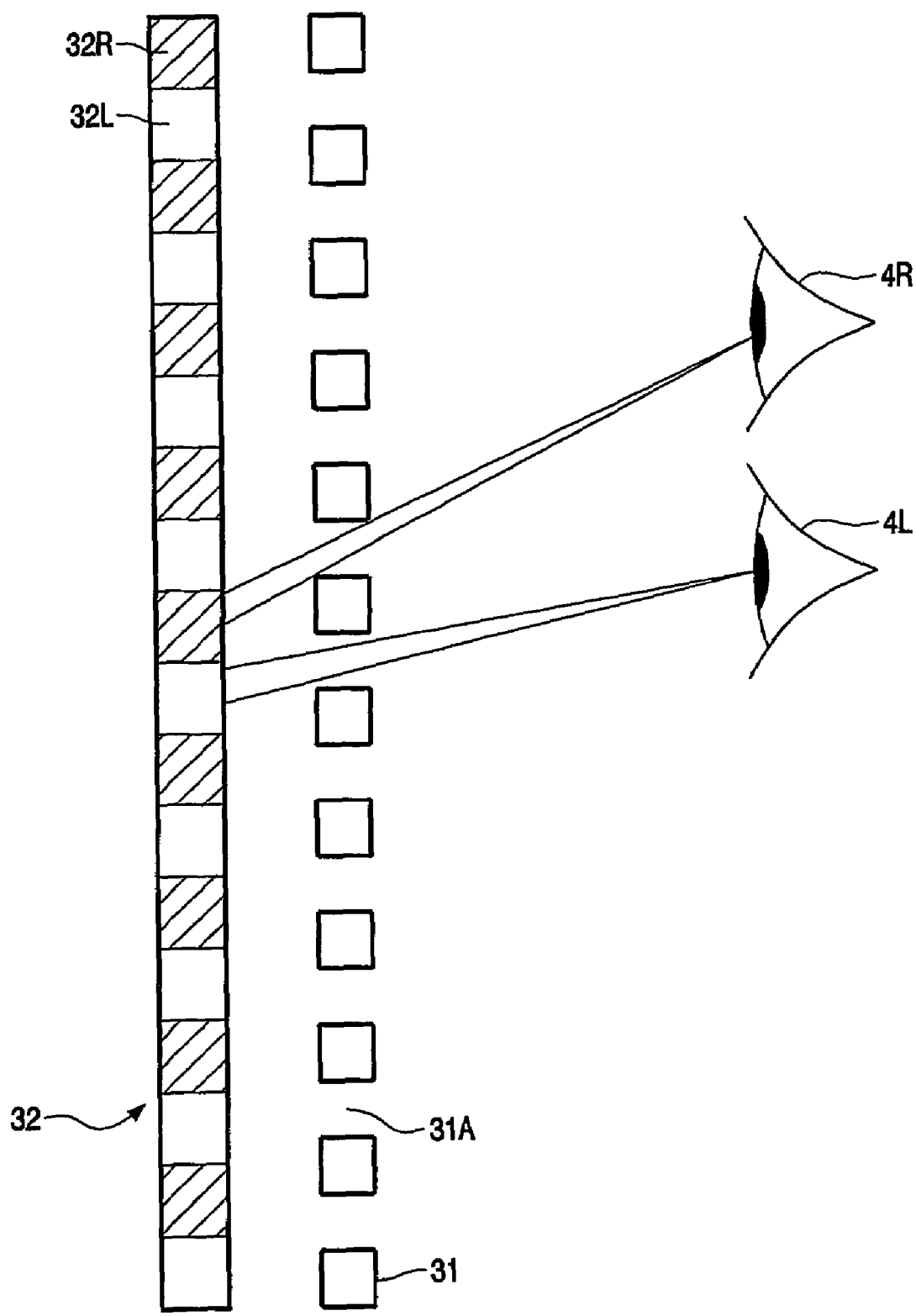
FIGS. 3A and 3B illustrate the principles of a barrier and a lenticular screen.

FIG. 3A illustrate the use of a parallax barrier.

In a conventional barrier auto-stereoscopic display system, a barrier 31 is disposed in front of a display array 32. The left and right images of a stereo pair of images are sliced into vertical strips. The strips 32L of the left image and the strips 32R of the right image are alternately disposed on array 32. Slots 31A are formed in barrier 31. Slots 31A are positioned so that the left eye 4L of an observer can see only strips 32L of the left image and the right eye 4R can see only strips 32R of the right image of the pair. The observer reconstructs the full image in three dimensions.

Figure 3B:
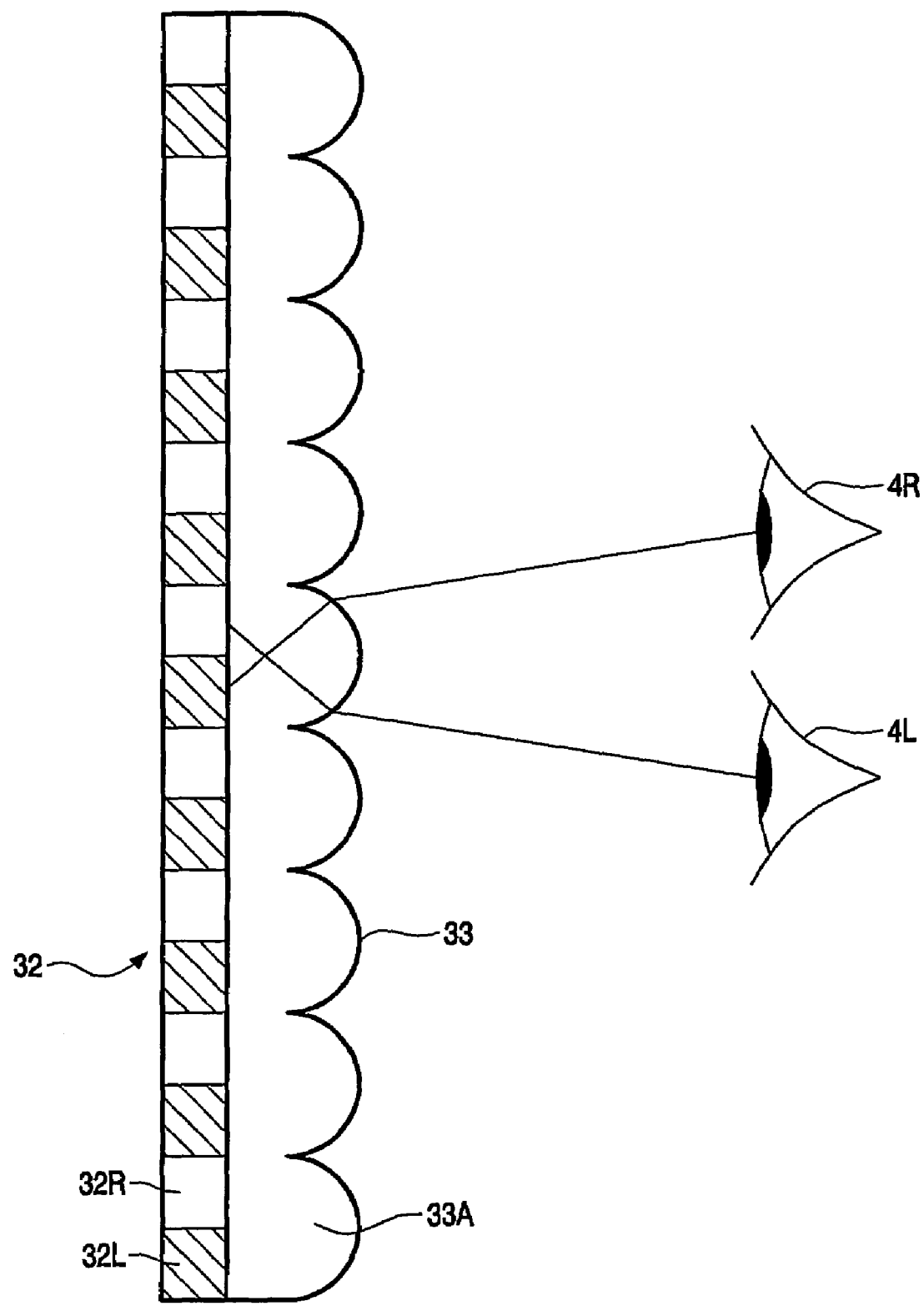

Referring now to FIG. 3B, a similar principle is explained in which barrier 31 is replaced by a lenticular lens screen 33 having an array of vertical cylindrical lenses 33A each corresponding to a different pair of left and right image strips 32L and 32R. In operation each lens directs the left eye 4L of an observer onto a left image strip 32L and the right eye 4R of the observer onto a right image strip 32R.

Figure 4:
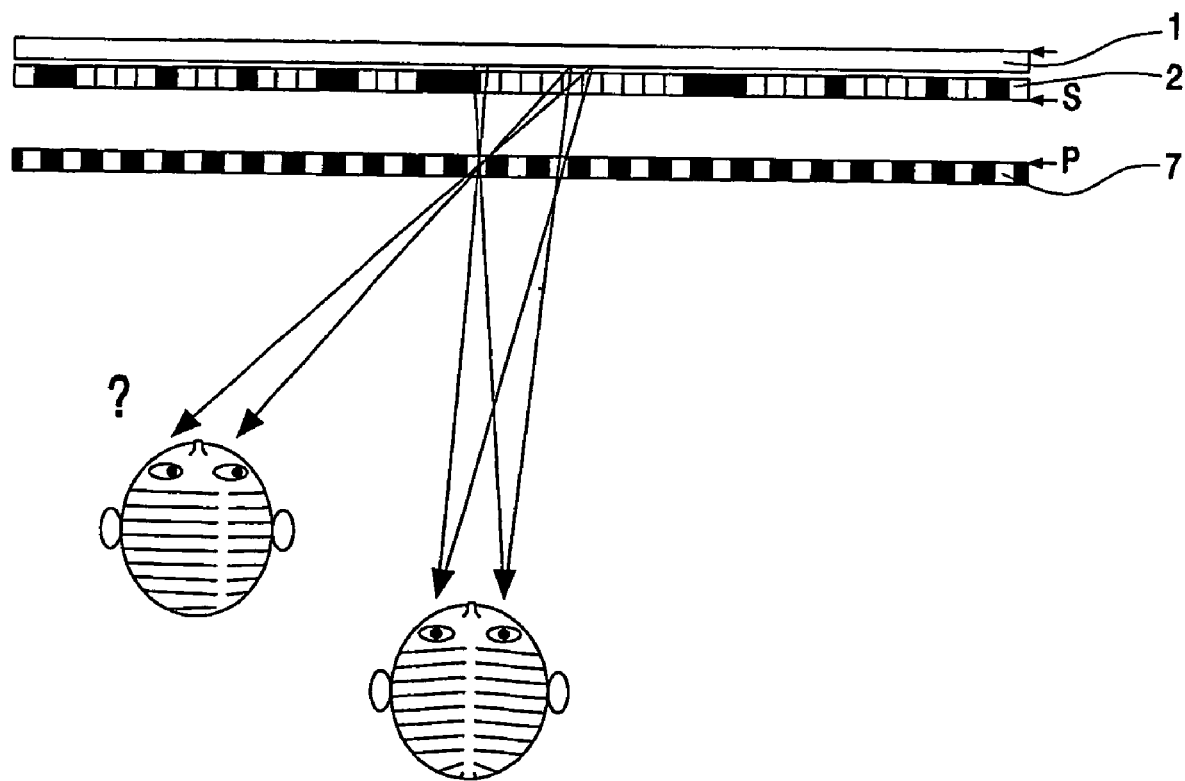
FIG. 4 illustrates the problem encountered with a basic parallax barrier display.

FIG. 4 illustrates the problem of a basic stereoscopic device. A viewer which is not seated within the right viewing zone is confused. The viewing zone is very narrow. Outside the viewing zone, the observer sees multiple images or a stereo inversion, leading to a very unpleasant view. In practice this means that for many application, for instance in living rooms, the viewing zone is so small that the viewer has to be seated at one particular spot only to be able to see anything. For living room use this is far from optimal since only one viewer can see the 3D image and then only when seated on one spot.

Figure 5:
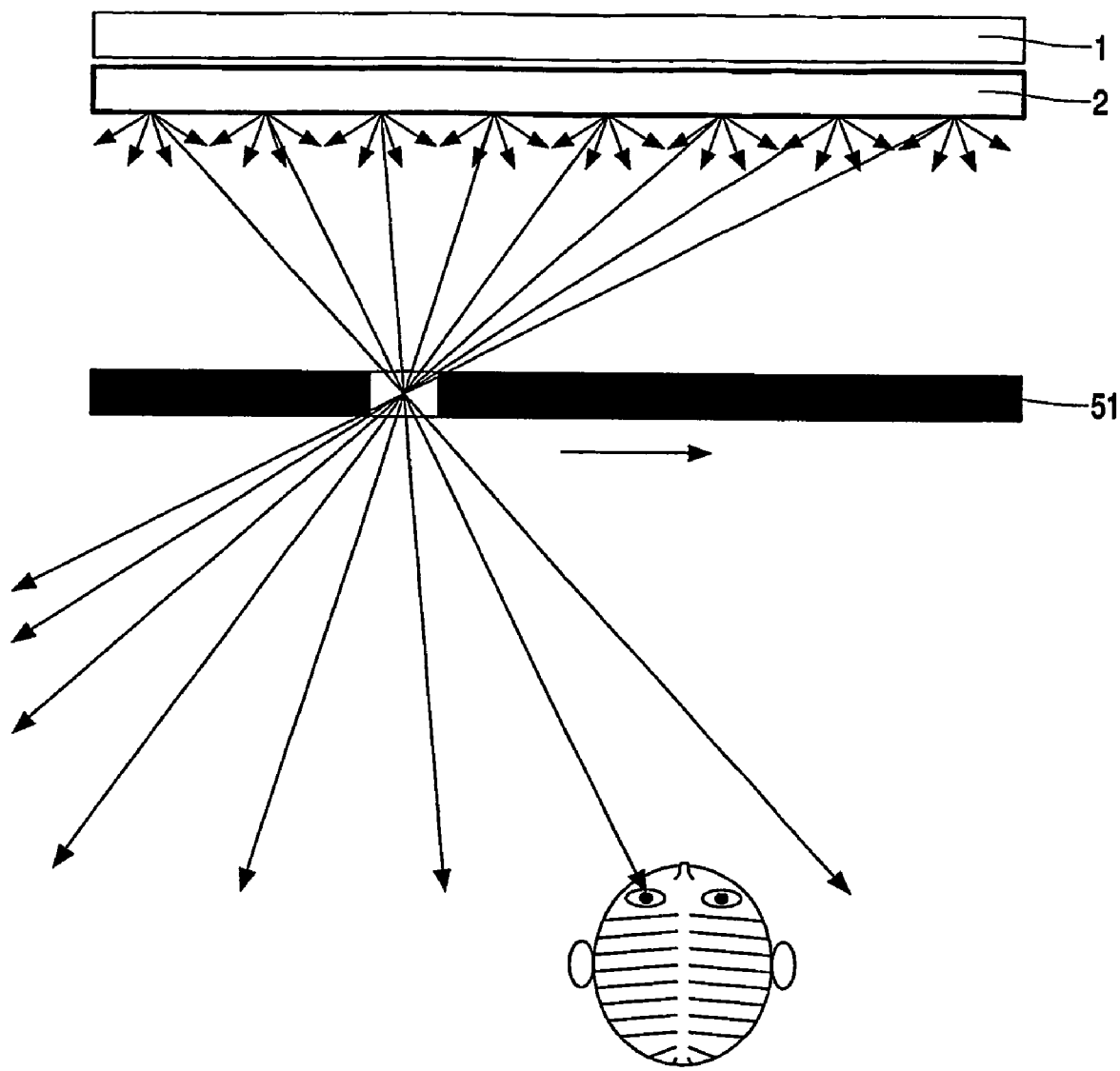
FIG. 5 illustrates a known multi-view devices

FIG. 5 illustrates schematically a device as known from United States Patent U.S. Pat. No. 5,969,850. In this device a solution to the narrow viewing zone problem is offered by using a dynamic parallax barrier 51, i.e. a parallax barrier wherein the barrier slits move across the screen.

Although it is possible to obtain a multiview autostereoscopic display in the manner described in U.S. Pat. No. 5,969,850, a drawback of the above described principle is a lack of efficiency. Only a small amount of the light emitted passes the dynamic parallax barrier. For instance, if we use a parallax barrier display with 1000 slots (so, 1000 subframes), we have a horizontal resolution of 1000 pixels. However, the light shines on the whole backside of the parallax barrier and the latter blocks 99:9% of the light. So, for a television application we need at least a very high light intensity to get a sufficiently bright picture. Although the efficiency can be improved by making several slots of the dynamic barrier transparent at the same time, the principle problem of a very poor efficiency remains and in order to be able to use several slots the amount of different viewing directions has to be compromised Besides the deterioration of resolution which is present for lenticular lenses and parallax barriers alike, the light transmission through a parallax barrier is also greatly reduced, since only one of about 100 vertical lines of the barrier is transparent. This blocking of (more than) 99% of the light results in an extremely inefficient display.

Thus the problem remains that an good 3D display should be autostereoscopic in the sense that no glasses are required yet have a good light output.

Furthermore it preferably has a "look-around" capability to avoid problems with focussing of the eye and headaches. Preferably this capability should be intrinsic to the display, without additional means for tracking the head of the viewer.

For TV applications, the display must also have a multi-viewer capability. Finally, the 3D display should also be 2D compatible. The above autostereoscopic displays with multiviewer capability can in principle be made by means of a lenticular screen or a parallax barrier, but at the cost of a greatly reduced resolution.

To this end the device in accordance with the invention is characterized in that the display device comprises a means for providing collimated light emitted by the pixels of the display array, a cylindrical lens for focusing the image displayed on the display array in a direction perpendicular to the longitudinal axis of the cylindrical lens, the device further comprising a display screen comprising a number openings, preferably provided with cylindrical lenses upon which the image displayed on the display array is in operation focused, and a scanning means to sequentially scan over openings (preferably over said cylindrical lenses) on the display screen, and means for changing the image information on the display array in a rate corresponding to the frequency of scanning of the openings in the display screen.

Figure 6:
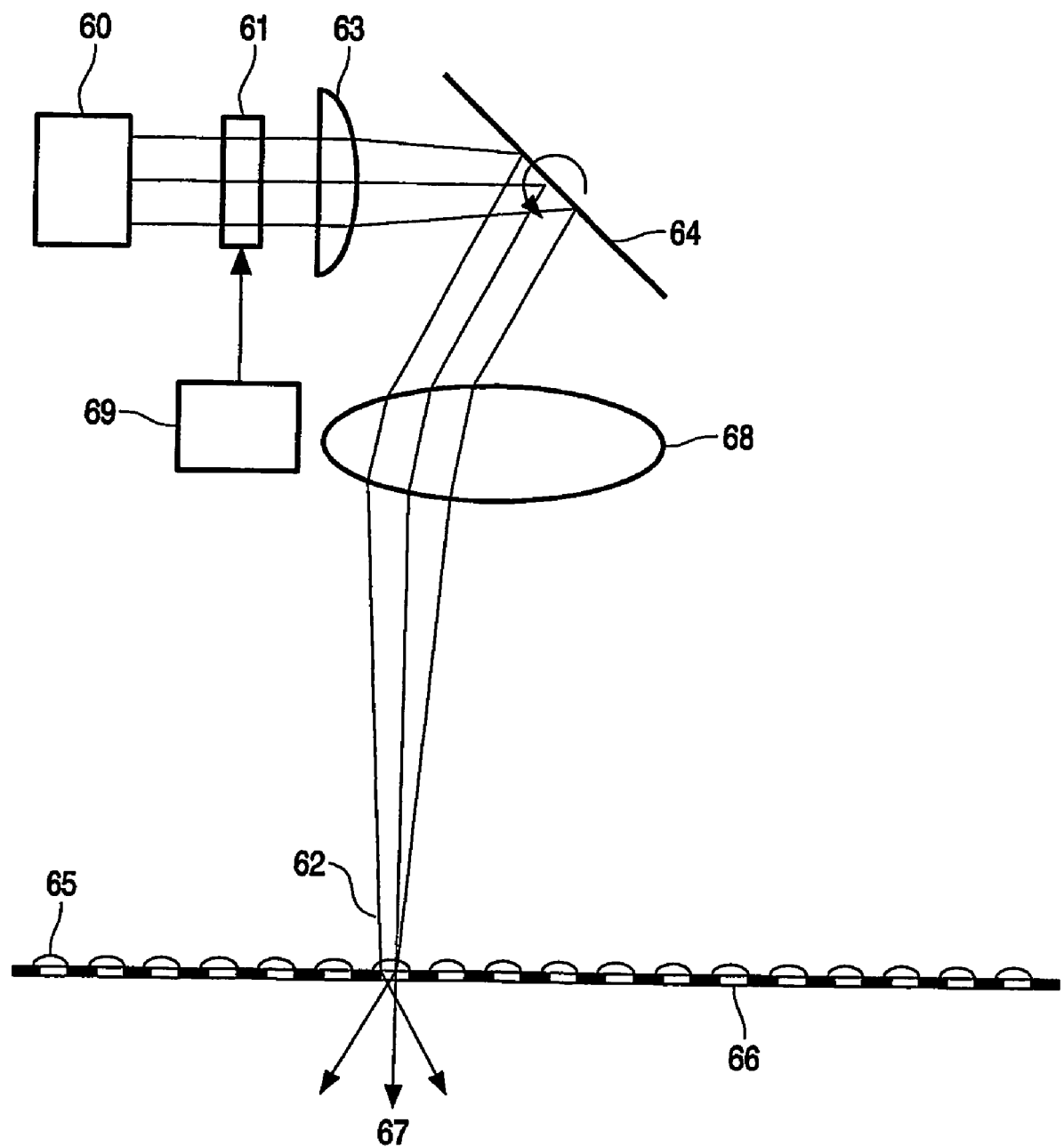
FIG. 6 illustrates a display device in accordance with the invention

The principle of the device in accordance with the invention is schematically shown in FIG. 6, which shows a simple embodiment of the invention.

The viewing directions of every vertical line in the display are constructed by projecting collimated light from light source 60 passing through a two dimensional display array 61 on one vertical line 62 by means of a positive cylindrical lens 63. During a frame time, the columns are scanned from left to right (or the opposite) by means of a rotating mirror or polygon 64. For each vertical line 62 a cylindrical lens 65 is provided on a display screen 66. For every vertical line 62 on the screen 66 a new picture is displayed on the two-dimensional display 61. The cylindrical lenses 65 on which this line (which in reality comprises a full picture) falls expands in preferred embodiments into light rays 67. The display array has to be sufficiently fast to change the picture on the display array in tune with the scanning over the openings (or in preferred embodiments the cylindrical lenses). LCD's based on ferro-electric liquid crystals are e.g. sufficiently fast.

To increase the total viewing angle, the use of optical elements like cylindrical lenses 65 at the screen position is preferred. Without these elements, i.e. when the screen is simply provided with openings the viewing angle would be too small for a domestic television application. In addition, additional optical elements such as a lens 68 are preferred to reduce the depth of the display.

The display device in accordance with the invention does not have the efficiency problems as discussed for the display of FIG. 5. In the display device in accordance with the invention all (or at least almost all) light from the display array 61 is used to construct a picture. However, this light has to be collimated. A suitable collimated light source might be an LCD-projector ("beamer") or laser light might be used. In the latter case, one might using a scanning laser beam to generate the two-dimensional picture. The display device in accordance with the invention is backward compatible. Normal video can be shown by having the same luminance information in every directional view. I.e. every pixel in a row of the two-dimensional display array shows the same information. It is within the concept of the invention also possible to use a display array emitting light into all directions and them collimating said light, i.e. putting a light collimating element in between an emitting light array and the rotating mirror or polygon. However, this usually means that only a part of the emitted light is effectively used, often only using a few to a few tens of the emitted light. However, even in such embodiments the efficiency of the display device in accordance with the invention far exceeds the efficiency of the known devices. The array is coupled to a control device 69 to make an image on the display array.

To get a good front of screen performance, it is preferred to synchronize the (sub)frame rate of the two-dimensional display and the rotating angle of the mirror or polygon. For instance, this can be achieved by means of a feed-back mechanism that uses a photo-diode(s) to detect the position of the beam on the screen.

Figure 7:
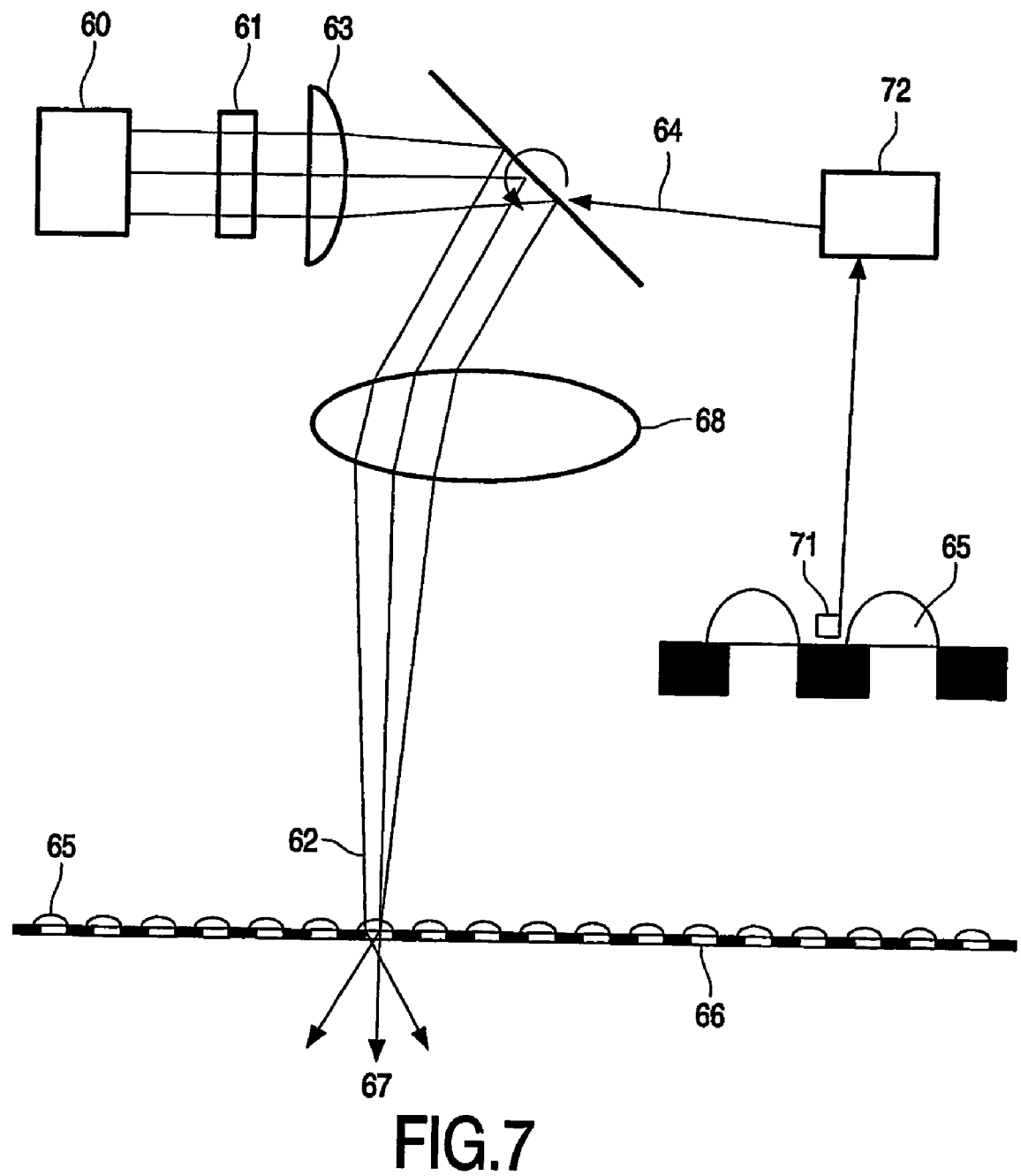
FIGS. 7, 8 and 9 illustrate further examples of display devices in accordance with an embodiment of the invention The figures are not drawn to scale. Generally, identical components are denoted by the same reference numerals in the figures.

FIG. 7 illustrates such an embodiment. In this fig. a part of screen 66 is enlarged to show a photo-sensitive element, such as a photo-diode 71 on the screen. The signals from the photo-sensitive element 71 are send to a control device 72 which via a feed-back mechanism regulates the rotating mirror or polygon 64. It is remarked that "rotating" within the concept of the invention comprises any movement which scans the image of the display array over the display screen. In the simplest embodiments this is a rotating movement, it may, however also be a tilting or rocking (back-and forth) movement.

Figure 8:
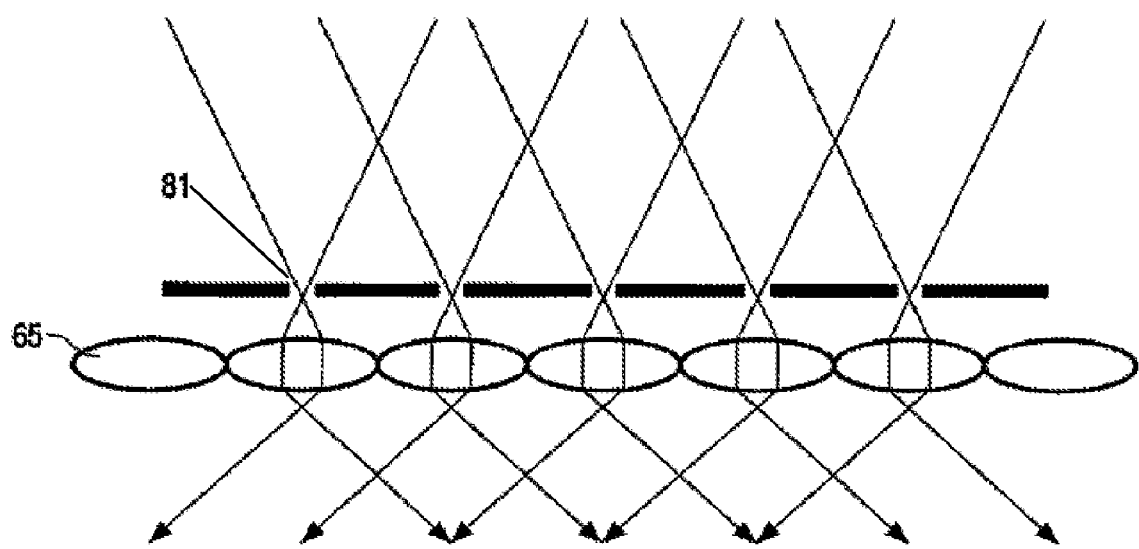

In another preferred class of embodiments the device is provided with a slit shadow mask in between the scanning means 64 and the display screen 66. To get a good performance its must be ensured that the image intended to fall on an opening (such as e.g. on cylindrical lens 65), indeed falls on the cylindrical lens. By using a slit shadow mask in between the scanning means and the display screen slight misalignments of the light path are counteracted, be it at a cost of reducing the brightness of the display. FIG. 8 schematically illustrates a detail of a device in accordance with such an embodiment. In front of the lenses 65 (i.e. in the light path between the scanning means (such as e.g. a rotating mirror) and the lenses a slit shadow mask 81 is positioned. The shadow mask ensures that the light falls only on the lenses. This increases the performance of the device, but at the cost of light output.

It will be clear that within the concept of the invention many variations are possible.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

Figure 9:
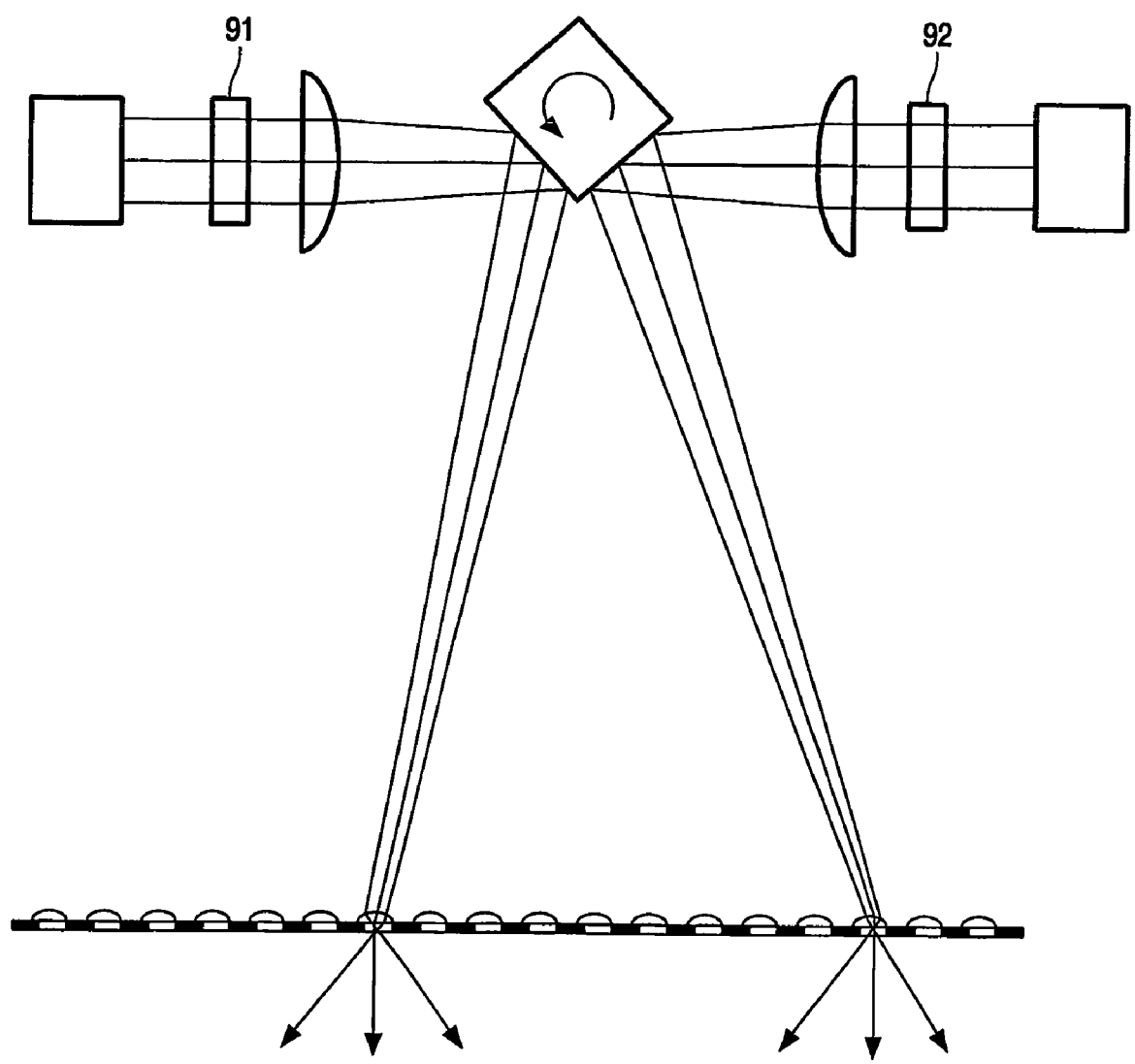

For instance, whereas in the so far shown exemplary embodiments only one display array is used, in embodiments of the display device in accordance with the invention more than one display array could be scanned over the screen or over part of the screen. Such an embodiment is schematically shown in FIG. 9 in which two display arrays 91, 92 are present This can be advantageously used to increase the light output or to reduce the refresh rate of the displays.

A further example of a variation on the shown exemplary embodiments is formed by e.g. embodiments in which as a lens (either for lens 63 or 68) a curved mirror surface is used. As is well known a concave mirror surface, if properly shaped, acts as a lens, so within the concept of the invention "lens" may be a mirror surface acting as a lens. When using a lens the lens may be to some extent dynamic, e.g. by changing the position of the lens (back and forth towards the screen for lens 68 or towards the rotating mirror for lens 63) depending on the line on the screen to which the light is directed. A better focusing is thereby obtainable. When using a mirror surface the position as well as the curvature may be dynamic.

In short the invention may be described by:

An autostereoscopic display device comprises a display array with addressable pixels. The display device comprises a means for providing collimated light (60) emitted by the pixels of the display array (61), and a cylindrical lens (63) for focusing the image displayed on the display array on a display screen (66). A scanning means (64) is provided to sequentially scan over said display screen, and means (69) for changing the image information on the display array (61) in a rate corresponding to the frequency of scanning of the openings in the display screen are also provided.

The invention claimed is:

1. An autostereoscopic display device comprising:
   a display array that includes a number of addressable pixels,
   a means for addressing the pixels in the display array to form an image,
   a means for providing collimated light emitted by the pixels of the display array,
   a display screen that includes a number of openings,
   a cylindrical lens for focusing the collimated light onto the openings of the display screen,
   a scanning means to sequentially scan the image from the cylindrical lens over said openings on the display screen, and
   means for changing the image information on the display array at a rate corresponding to a frequency of scanning of the openings in the display screen.

2. The autostereoscopic display device of claim 1, wherein the device includes cylindrical lenses that are in, near to or on the display screen.

3. The autostereoscopic display device of claim 1, wherein the display device includes a lens between the scanning means and the display screen.

4. The autostereoscopic display device of claim 1, wherein the display device includes index light sensors on or near the display screen.

5. The autostereoscopic display device of claim 1, wherein the display device includes a shadow mask between the scanning means and the display screen.

6. An autostereoscopic display device comprising:
   a display array that includes a number of addressable pixels for forming an image,
   a display screen that includes a number of openings,
   a cylindrical lens that is configured to:
      receive collimated light emitted by the pixels of the display array, and
      focus the collimated light upon the openings on the display screen,
   a scanning device that is configured to sequentially scan the image from the cylindrical lens over the openings on the display screen, and
   a controller that is configured to change the image information on the display array at a rate corresponding to a frequency of scanning the openings in the display screen.

7. The autostereoscopic display device of claim 6, wherein the device includes cylindrical lenses that are in, near to, or on the display screen.

8. The autostereoscopic display device of claim 7, wherein the display device includes a lens between the scanning device and the display screen.

9. The autostereoscopic display device of claim 8, wherein the display device includes index light sensors on or near the display screen.

10. The autostereoscopic display device of claim 7, wherein the display device includes index light sensors on or near the display screen.

11. The autostereoscopic display device of claim 7, wherein the display device includes a lens between the scanning device and the display screen.

12. The autostereoscopic display device of claim 6, wherein the display device includes a lens between the scanning device and the display screen.

13. The autostereoscopic display device of claim 12, wherein the display device includes index light sensors on or near the display screen.

14. The autostereoscopic display device of claim 13, wherein the display device includes a shadow mask between the scanning means and the display screen.

15. The autostereoscopic display device of claim 6, wherein the display device includes index light sensors on or near the display screen.

16. The autostereoscopic display device of claim 15, wherein the display device includes a shadow mask between the scanning means and the display screen.

17. The autostereoscopic display device of claim 6, wherein the display device includes a shadow mask between the scanning means and the display screen.

* * * * *